United States Patent [19]

Clark et al.

[11] Patent Number: 6,128,746
[45] Date of Patent: Oct. 3, 2000

[54] CONTINUOUSLY POWERED MAINSTORE FOR LARGE MEMORY SUBSYSTEMS

[75] Inventors: Scott D. Clark; Mark G. Veldhuizen; Randall S. Jensen; Joseph A. Kirscht; Paul W. Rudrud, all of Rochester, Minn.

[73] Assignee: International Business Machines Corporation, Armonk, N.Y.

[21] Appl. No.: 08/917,490

[22] Filed: Aug. 26, 1997

[51] Int. Cl.[7] .................................................. G06F 1/26
[52] U.S. Cl. ............................................................ 713/324
[58] Field of Search .................................. 713/300, 320, 713/323, 324

[56] References Cited

U.S. PATENT DOCUMENTS

| | | | |
|---|---|---|---|
| 4,383,184 | 5/1983 | McFarland | 307/66 |
| 5,490,118 | 2/1996 | Nishioka et al. | 365/229 |
| 5,600,841 | 2/1997 | Culbert | 395/750 |
| 5,604,709 | 2/1997 | Price | 365/229 |
| 5,675,808 | 10/1997 | Gullick et al. | 395/750 |
| 5,898,880 | 4/1999 | Ryu | 395/750.05 |

*Primary Examiner*—Ayaz R. Sheikh
*Assistant Examiner*—David A. Wiley
*Attorney, Agent, or Firm*—Michael K. Mutter; John A. Castellano

[57] ABSTRACT

A memory arrangement, where a memory control logic, which drives a memory array, is maintained in a volatile power domain, and clock redrive circuitry, address control redrive circuitry, data transceiver, and the memory array itself are all maintained in a non-volatile power domain, in order to increase the effective life time of a battery backup system. The memory arrangement includes buffering circuitry to prevent leakage currents, and the appropriate control of nets between the memory control logic and the memory array, in order to avoid additional sources of leakage current and bus driver contentions.

14 Claims, 9 Drawing Sheets

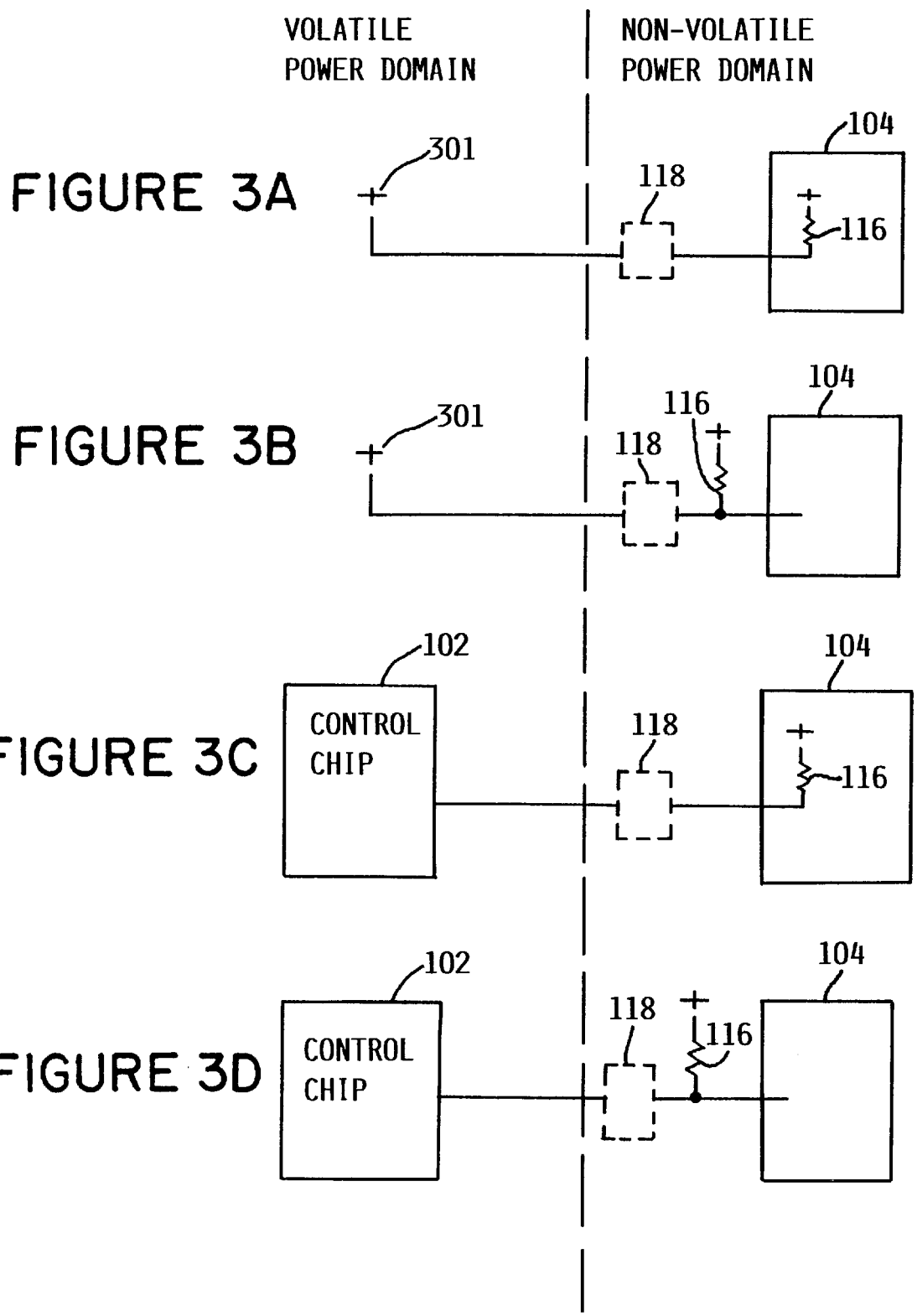

CONTINUOUSLY POWERED MAINSTORE FOR LARGE MEMORY SUBSYSTEMS

BACKGROUND OF THE INVENTION

The present invention relates in general to a continuously powered mainstore for large memory subsystems, which increases the effective lifetime of a battery backup system, when running in a battery backup mode. More particularly, the present invention relates to a memory arrangement, where the memory control logic which drives a memory array, is maintained in a volatile power domain, and clock redrive circuitry, address control redrive drive circuitry, data transceivers, and the memory array itself all are maintained in a non-volatile power domain. Such an arrangement reduces the power consumption of the entire computer system and significantly increases the effective lifetime of the battery backup system.

DESCRIPTION OF RELATED ART

Computer systems often feature a low power mode, to reduce power consumption when in an idle state, to survive utility failures by allowing battery backup, or any time when a change is made to data in memory and there is not sufficient time to write the new data to disk. During this low power time, it is also desirable to maintain the contents of the memory array to facilitate shorter initial program load (IPL) time upon full power restoration.

A typical solution for providing a low power mode generally involves reducing the power consumption of the entire computer system by slowing or stopping system clocks or refresh rates, or by removing power to all system components except the memory array and the memory control logic as well as any associated repowering of clock, control, address and data signals to support the memory array. For large computer systems, this solution may still involve significant power consumption by the memory control logic, thereby reducing the effective lifetime of the battery backup system.

Another solution includes powering down certain elements of the computer system and running other components of the computer system in the battery backup mode. This involves operating the memory control logic, redrive circuitry and memory array via battery backup. This is convenient, because it allows the interface between the memory control logic and the remainder of the computer system to be easily tri-stated. However, the memory control logic's power consumption is significant, which reduces the effective lifetime of the battery backup system.

SUMMARY OF THE INVENTION

Because maintaining the memory control logic in the non-volatile power domain results in significant power consumption, the present invention places the memory control logic in the volatile power domain, where the volatile power domain includes elements which are not provided battery power, and only maintains the clock redrive circuitry, address redrive circuitry, data transceivers, and memory array in the non-volatile power domain where the non-volatile power domain includes elements which are provided battery power, in order to reduce power consumption and thereby increase the effective lifetime of the battery backup system.

In the present invention, all power is removed from the system components except for the memory array and supporting redrive logic. This is a convenient boundary since the redrive logic is typically packaged with the memory array onto a card that is plugged into a motherboard. However, in order to maintain the contents of the memory array, the interface between the memory control logic and the memory array must be kept in a correct state, even though the memory control logic driving interface no longer has power. The memory array must have the capability of supporting a self-refresh mode in which the memory array can be put into a state by the memory control logic such that all refreshing of the dynamic array is performed on the memory card or within the array chips themselves and only require a minimum steady state control signal, typically one signal active "LOW", to maintain the array in this state. A pull-down resistor is added to this control net to ensure a "LOW" logic level is maintained when the power is removed from the memory control logic that normally drives the signal.

Placing the memory control logic in the volatile power domain while the redrive circuits and the memory array are in the non-volatile power domain causes other problems, since the interface between the redrive circuitry and the memory control logic cannot just be tri-stated, as is the case with the interface between the memory control logic and the remainder of the computer system. Two such problems are the presence of leakage current and bus driver contentions. With respect to leakage currents, additional circuitry must be added in the non-volatile power domain in order to prevent current from leaking from the non-volatile power domain into the volatile power domain. With respect to bus driver contentions, additional circuitry must be added to control the bidirectional latch transceivers in order to alleviate the possibility of a bus driver contention.

It is an object of the present invention to reduce the power consumption of a large memory sub-system in a battery backup mode, by maintaining the memory control logic which drives the memory array in a volatile power domain while clock redrive circuitry, address control redrive circuitry, data transceivers, and a memory array itself are all maintained in a non-volatile power domain.

It is another object of the present invention to provide a buffer device for preventing current leakage from the non-volatile power domain into the volatile power domain, in the low power mode.

It is still another object of the present invention to provide a "LOW" signal on all nets between the non-volatile power domain and the volatile power domain, in order to prevent the leakage of current into the volatile power domain.

It is still another object of the present invention to provide a disable signal to the bidirectional data transceiver, during the low power mode, in order to prevent a bus driver contention in the bidirection data transceiver between the memory control logic circuitry and the memory array.

The objects of the present invention are achieved by providing a memory circuit for storing data, a memory control circuit for controlling the flow of data to and from the memory circuit and a redrive circuit for boosting control and data signals received from the memory control circuit and supplying the boosted control and data signals to the memory circuit, and when the computer system is in a low power mode, the redrive circuit and the memory circuit are maintained in the non-volatile power domain and the memory control logic is maintained in the volatile power domain.

The object of the present invention are further achieved by providing a buffer device for preventing current leakage from the non-volatile power domain into the volatile power domain in the LOW power mode.

The object of the present invention are further achieved by a method of controlling a computer system, which includes a memory circuit, a memory control circuit and a redrive circuit to enter and exit a low power mode, which includes the steps of placing the memory circuit in a self-timed refresh mode, upon receipt of a low clock enable signal and a self-timed refresh command from the redrive circuit, driving all the outputs of the memory control circuit to the redrive circuit LOW, tri-stating all outputs of the memory control circuit to the redrive circuit, removing volatile power to enter the low power mode, after a suitable time has passed, restoring volatile power to exit the low power mode, and removing the memory circuit from the self-timed refresh mode, upon receipt of a high clock enable signal from the redrive circuit.

These and other objects of the present invention will become readily apparent from the detailed description given hereafter. However, it should be understood that a detailed description and specific examples, while indicating preferred embodiments of the invention are given by way of illustration only, since various changes and modifications within the spirit and scope of the invention will become apparent to those skilled in the art from the detailed description set forth below.

BRIEF DESCRIPTION OF THE DRAWINGS

The present invention will become more fully understood from the detailed description given hereinbelow and the accompanying drawings, which are given by way of illustration only and thus are not limitative of the present invention, wherein:

FIGS. 3(a)–3(d) illustrate various arrangements of the pull-up circuit and buffer device of the present invention;

Figure 2A:
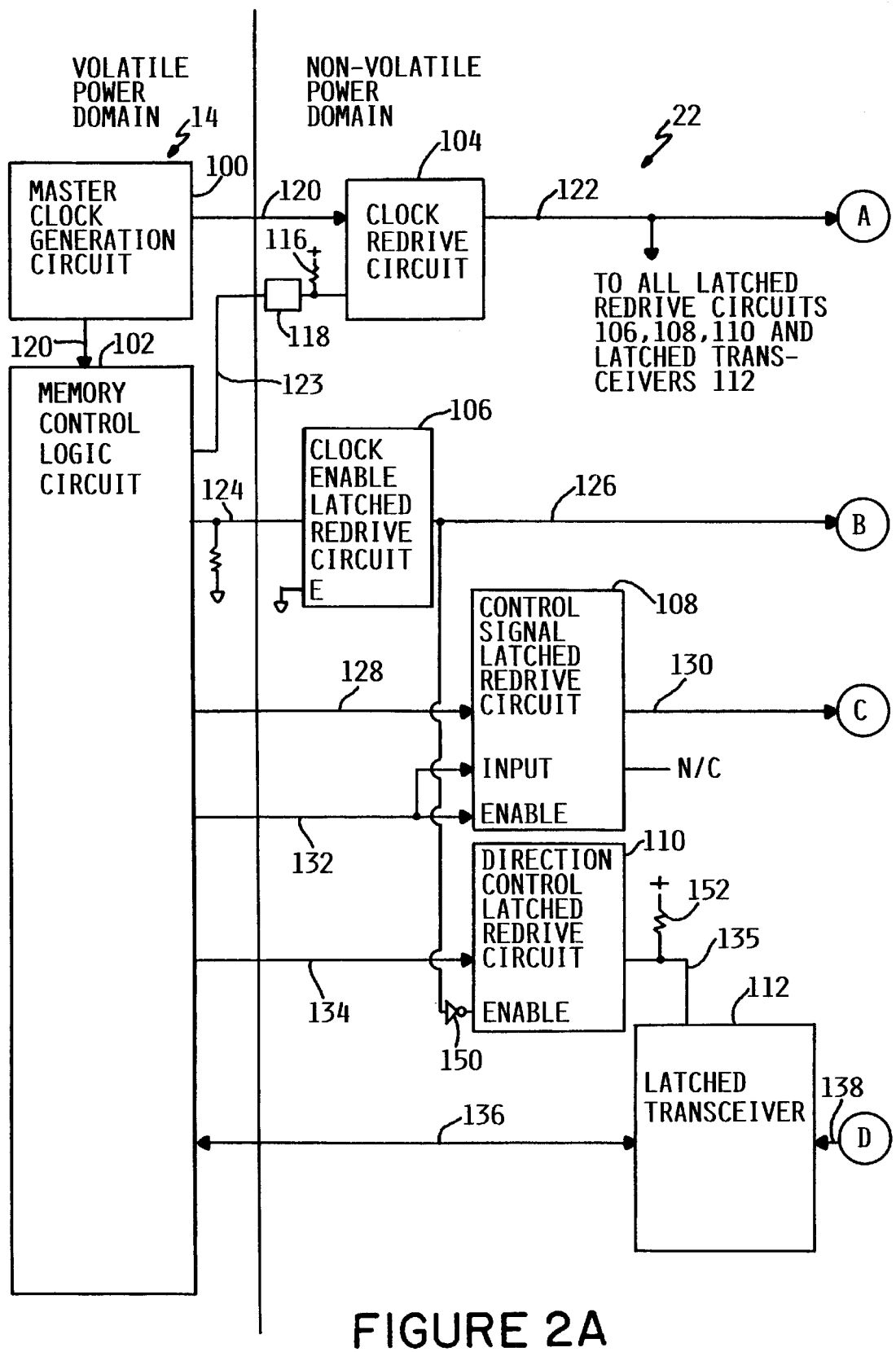
FIG. 2 illustrates the memory control logic and memory array of FIG. 1 in more detail.
Figure 2B:
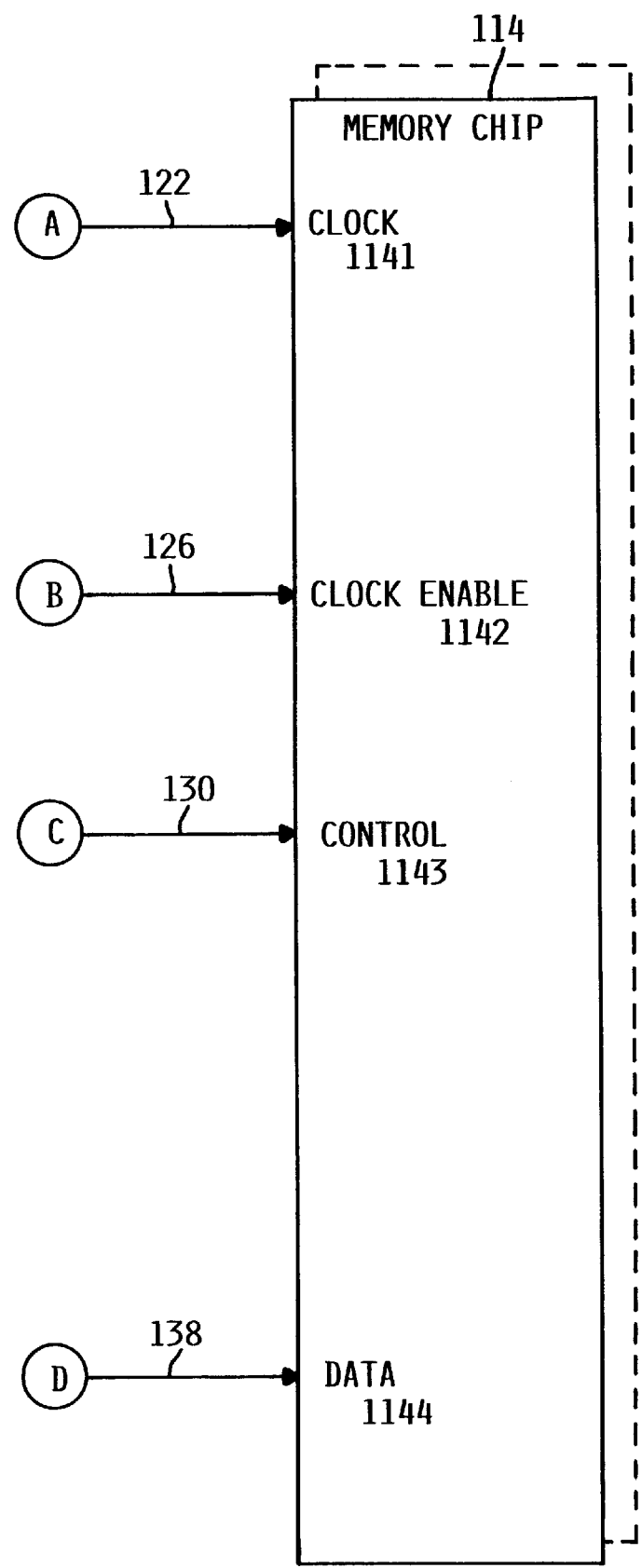

It is suggested that FIG. 2 be printed in the face of a patent issuing on the invention.

Further scope of applicability of the present invention will become apparent from the detailed description hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENT

Figure 1:
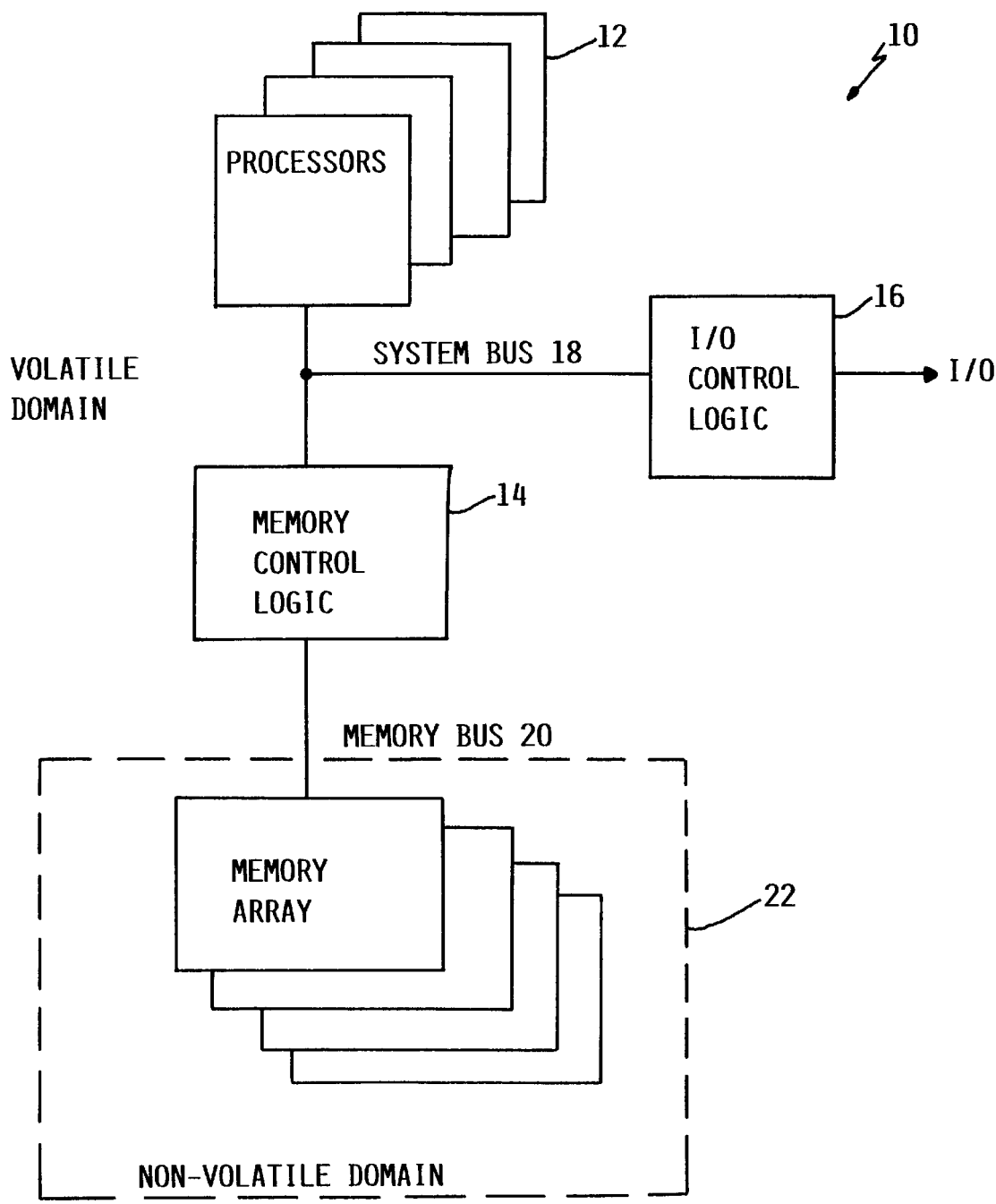
FIG. 1 illustrates an overall configuration of the continuously powered mainstore of the present invention, in one embodiment.

The overall computer architecture, in which the continuously powered mainstore of the present invention is implemented, is illustrated in FIG. 1. A computer system 10 includes processors 12, which are connected to memory control logic 14 and I/O control logic 16 via a system bus 18. The I/O control logic 16 exchanges data with I/O peripherals, which are not shown. The processors 12, memory control logic 14, and I/O control logic 16 are all within the volatile power domain. A memory bus 20 connects the memory control logic 14 to a memory array 22. The memory array 22 is in the non-volatile power domain.

The processors 12 issue commands to the memory control logic 14 in order to write to and read from the memory array 22. The memory control logic 14 receives the commands from the processors 12 and translates these commands into the correct command type for data retrieval and storage. The processors 12 also issue commands to the I/O control logic 16, in order to control the flow of data in and out of the computer system 10.

FIG. 2 illustrates the memory control logic 14 and the memory array 22 of FIG. 1 in more detail.

The memory control logic 14 includes a clock generation circuit 100 and a memory control logic circuit 102. The memory array 22 includes a large number of memory chips 114, each of which has a corresponding clock redrive circuit 104, clock enable latched redrive circuit 106, control latched redrive circuit 108, direction control latched redrive circuit 110, and latched transceiver 112. In a preferred embodiment, the memory control logic 14 is a synchronized system and each memory chip 114 is a synchronized DRAM. In another preferred embodiment, the synchronized DRAMs include a self-timed refresh mode.

The master clock generation circuit 100 outputs a base clock signal 120 to the clock redrive circuit 104 and to the memory control logic circuit 102. The clock redrive circuit 104 is provided because the base clock signal 120 must be provided to all clock enable latched redrive circuits 106, control latched redrive circuits 108, direction control latched redrive circuits 110 and latch transceivers 112. In a large memory array, there are numerous of these circuits, and as a result, the base clock signal 120 from the master clock generation circuit 100 must be boosted to reach all of the memory chips 114. The clock redrive circuit 104 outputs the boosted base clock signal 122 to all of the latched redrive circuits 106, 108, and 110 and the latched transceiver 112, for each memory chip 114 and to the clock pin 1141 of each memory chip 114.

A pull-up circuit 116 is also provided in the non-volatile power domain. FIG. 2 illustrates the pull-up circuit 116 as a resistor in the non-volatile power domain. The pull-up resistor 116, as illustrated in FIG. 2 is separate from the clock redrive circuit 104. Further, the pull-up resistor 116 is connected to the memory control logic circuit 102, via buffer device 118. As illustrated in FIGS. 3(a)-3(b), the pull-up resistor 116 can either be part of the clock redrive circuit 104 or separate from the clock redrive circuit 104. The pull-up resistor 116 may also be connected to a positive volatile voltage source 301, as illustrated in FIGS. 3(a) and 3(b) or the memory control logic circuit 102, as illustrated in FIGS. 3(c) and 3(d). The pull-up circuit 116 "pulls up" the value supplied to the clock redrive circuit 104 to a valid logic level in order to actively drive the clock redrive circuit 104.

The pull-up circuit 116 without the buffer device 118 provides a potential leakage path 123 from the non-volatile power domain into the volatile power domain during low power mode. This potential leakage path 123 causes a problem in low power mode, which is solved by buffer device 118. In a preferred embodiment, the buffer device 118 is a non-inverting buffer which eliminates the resistive path to the positive power across the interface from the non-volatile power domain to the volatile power domain. As a result, the buffer device 118 prevents current leakage from the non-volatile power domain to the volatile power domain in the low power mode, thereby increasing the effective life of the low power mode.

The memory control logic circuit 102 outputs a clock enable signal 124 to each of the clock enable latched redrive circuits 106. Each clock enable latched redrive circuit 106 boosts the clock enable signal 124 to produce a boosted clock enable signal 126, which is provided to the clock enable pin 1142 of each memory chip 114. Similarly, the memory control logic circuit 102 outputs a control signal 128 to each control signal latched redrive circuit 108. Each control signal latch redrive circuit 108 boosts the control signal 128 to produce a boosted control signal 130, which is output to the control signal pin 1143 of each memory chip 114. The boosted control signal 130 includes commands such as row-address select or RAS commands, column-address select or CAS commands, write commands, read commands, and self-timed refresh or STR commands. This control bus is a command and address bus and there are many different commands that can be put on the bus such as the ones listed above. The column address select or CAS command is typically utilized in combination with a write or read command, whereas the STR is a single command. The memory control logic circuit 102 also outputs a redrive enable signal 132, which enables the redrive of each control signal latched redrive circuit 108. The redrive enable signal 132 is a control signal for each control signal latch redrive circuit 108.

When the boosted clock enable signal 126 is high, reading to and writing from the memory chip 114 is conventionally performed. However, when the boosted clock enable signal 126 is low and the self-timed refresh or STR command is provided, this signals to the memory chip 114 to enter a self-timed refresh mode. In this mode, when the boosted clock enable signal 126 remains low, the memory chip 114 ignores all other inputs, and operates in the self-refresh mode.

The memory control logic circuit 102 outputs a direction control signal 134 to each direction control latched redrive circuit 110, which controls the directionality of data transfer of a corresponding data latched transceiver 112. The memory control logic circuit 102 also provides a data signal 136 directly to each data latched transceiver 112, which produced a boosted data signal 138. Each pair of redrive circuit 110 and latched transceiver 112 controls the flow of data either from the memory control logic circuit 102 to the memory chip 114 or vice-versa.

Figure 4A:
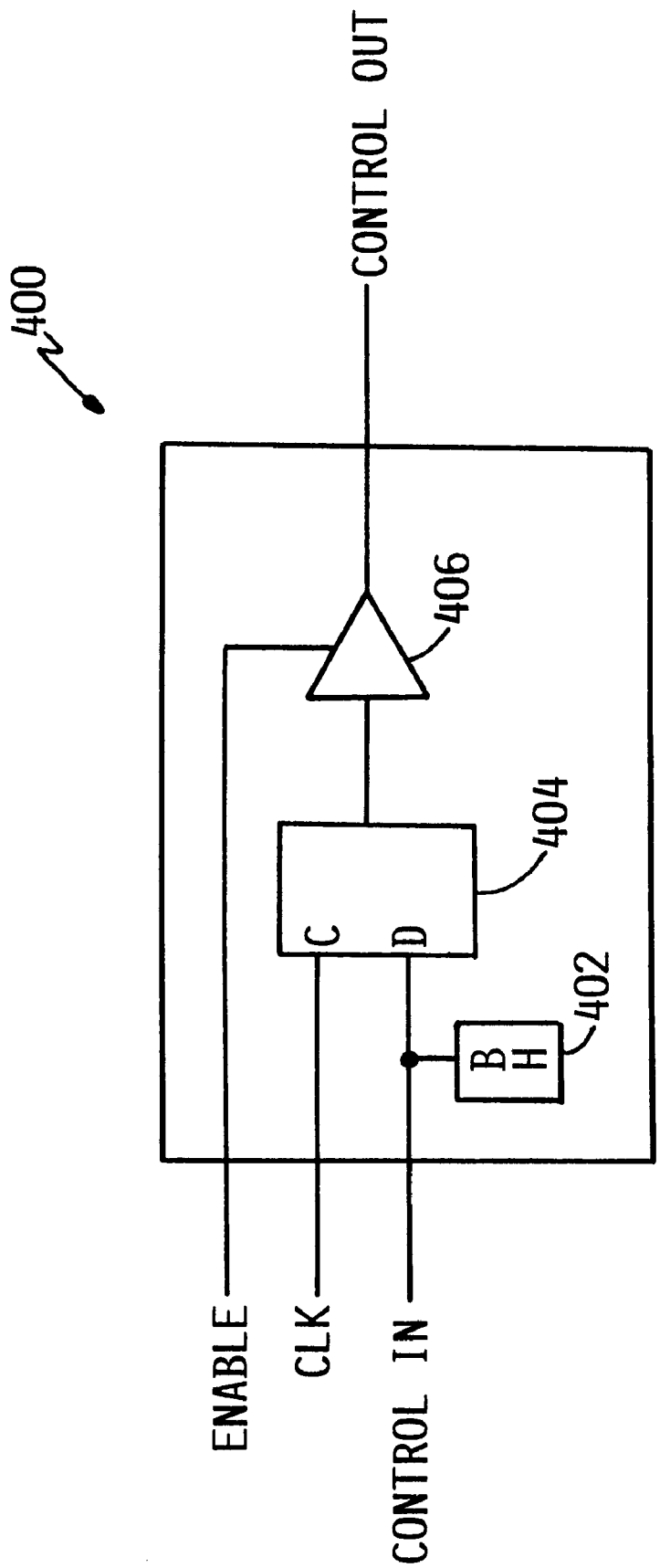
FIG. 4(a) illustrates a redrive circuit and FIG. 4(b) illustrates a transceiver circuit of FIG. 2.

FIG. 4(a) illustrates a redrive circuit 400, which is common to the clock enable latched redrive circuit 106, control signal latched redrive circuit 108, and direction control latched redrive circuit 110. The redrive circuit 400 includes a bus/hold circuit 402, an internal latch 404, and a driver 406. Each redrive circuit 400 receives an ENABLE signal, a CLOCK signal and a CONTROL IN signal and outputs a CONTROL OUT signal.

Figure 4B:
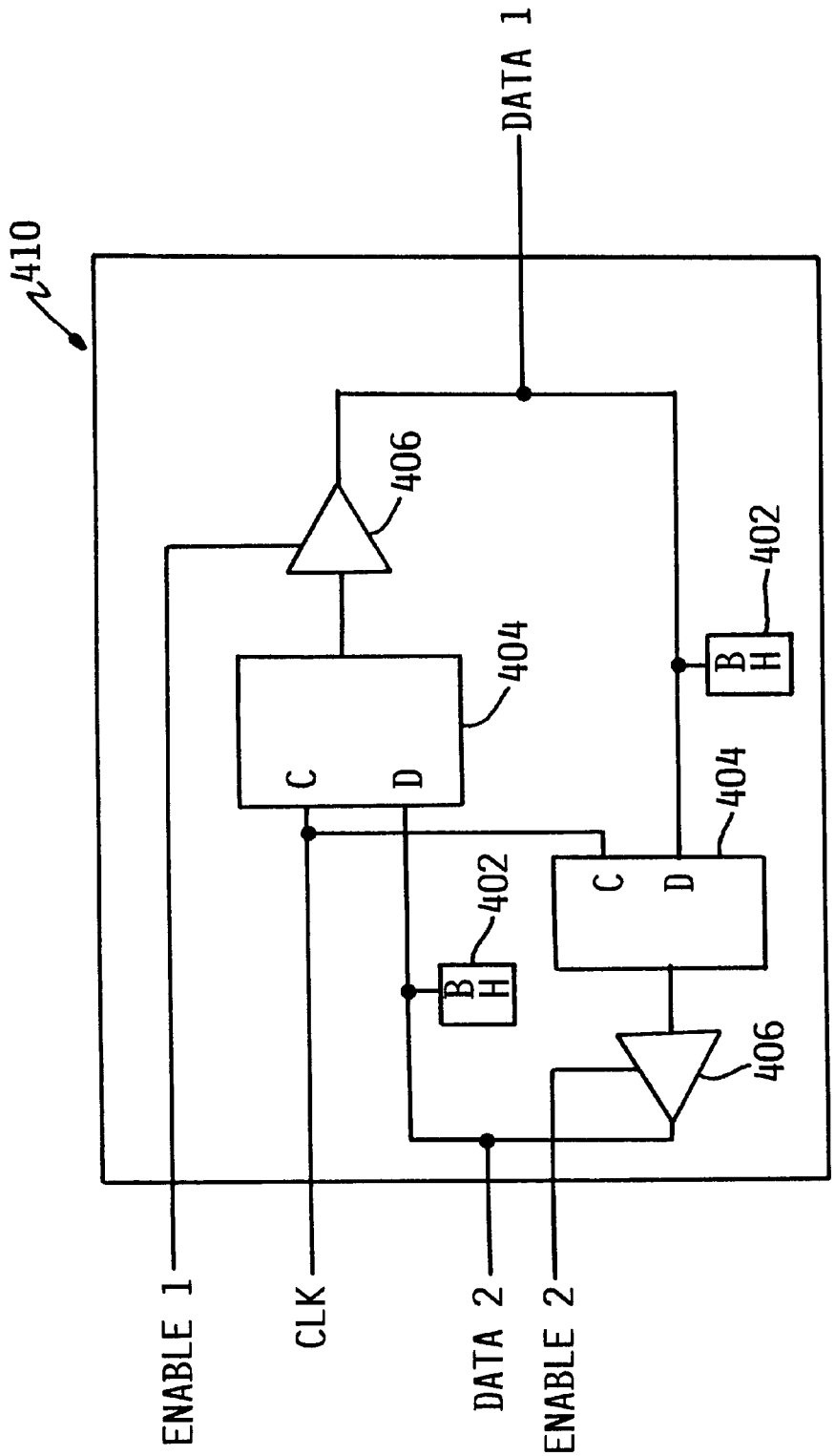

FIG. 4(b) illustrates a transceiver circuit 410, which is part of the latched transceiver 112. The transceiver circuit 410 includes an input and an output bus/hold circuit 402, and input and an output internal latch 404, and an input and output driver 406. Each bus/hold circuit 402 acts as a latch with a weak driver namely whatever signal was driven last, the bus/hold circuit 402 will try to hold even if the memory control logic circuit 102 or memory chip 114 has stopped driving. If the last signal provided to the bus/hold circuit 402 is "HIGH", before the interface between the memory control logic 14 and the memory array 22 is tri-stated, the bus/hold circuit 402 will attempt to hold a "HIGH" signal. In a low power mode, this high signal at the bus/hold circuit 402 looks like a current source with a path to ground into the volatile power domain, and therefore, current will flow from the bus/hold circuit 402 back into the volatile power domain, thereby decreasing the life of the low power mode. The solution to this problem in the present invention is to provide a "LOW" signal on all nets, forcing each bus/hold circuit 402 to latch "LOW". Since all of the inputs to the bus hold circuits 402 are "LOW", there is no leakage current into the volatile power domain.

The operation of the interaction between the memory control logic 14 and the memory array 22 will now be described in conjunction with the flowchart illustrated in FIG. 5 and the timing diagram illustrated in FIG. 6. In order for the computer system 10 to enter the low power mode, after the last memory operation 601 is performed at step 501, the memory array 22 enters the self-timed refresh mode at 602, by setting the clock enable 124 to "LOW" and receiving the STR command at step 502. The data from the last memory operation is held in the bus/hold circuit 402 of the latched transceiver 112. The outputs 124, 128, 132, 134, 136 of the memory control logic circuit 102 are then tri-stated at 603 and in step 503. Step 503 need not be performed as long as steps 504 and 505 are performed. Then, at 604 and step 504, all the nets, including the control signal, direction control, address and data signals are all forced to a "LOW" value.

Since the bus/hold circuits 402 of the control signal latch redrive circuit 108, direction control latch redrive circuit 110, and latch transceiver 112 act as latches with weak drivers, these bus/hold circuits 402 will attempt to hold the last signal "HIGH" if that was the last signal provided before the interface between memory control logic 14 and the memory array 22 is tri-stated. A "HIGH" signal at the bus/hold circuit 402 looks like a current source with a path to ground into the volatile power domain, and therefore, current will flow from the bus/hold circuit 402 back into the volatile power domain. By driving all the nets "LOW" at 604, there will be no "HIGH" signals at the bus/hold circuits 402, and therefore no paths to ground, by which current can flow back into the volatile power domain. Once all the nets are driven "LOW" at 504 by the memory control logic 14, the outputs 124, 128, 132, 134, 136 of the memory control logic circuit 502 are again tri-stated at 605 and in step 505 are held "LOW" by the bus/hold circuits 402. When volatile power is removed at 606 and in step 506, all the nets are continued to be held "LOW" by the bus/hold circuits 402. At 607 and step 507, volatile power is restored. At 608 and step 508, the outputs 124, 128, 132, 134, 136 of the memory control logic 102 are un-tristated. At 609 and step 509, the clock enable 126 is taken "HIGH" in order to remove the memory array 22 from the self-timed refresh mode, and at 610 and step 510, a new memory operation is processed with volatile power restored.

However, driving all the nets "LOW" at 604 and in step 504, may cause a bus driver contention within the transceiver 410. For example, if the direction control signal 134 and the signal 135 are both "LOW", latched transceiver 112 will be driving in both directions. As illustrated in FIG. 4 (b), if DATA 1, provided from the memory chip 114 was last driven "HIGH" before tri-stating and DATA 2, provided from the memory control logic circuit 102 is forced "LOW" at 604 and step 504, there may be a bus contention problem. In particular, the transceiver circuit 410 will be attempting to drive out a "HIGH" signal on DATA 2 while the memory control logic circuit 102 is attempting to drive a "LOW" signal to transceiver circuit 410. In order to alleviate this bus driver contention, the boosted clock enable signal 126 is driven "LOW" at 502. This signal is inverted by invertor 150 and then supplied to direction control latch redrive circuit 110. Since the net at 135 is tri-stated, the resistor 152 pulls the signal 135 "HIGH", which also pulls ENABLE 1 and ENABLE 2 to "HIGH", thereby preventing the transceiver circuit 410 from writing or reading, and therefore, eliminating the bus driver contention.

The present invention also includes an alternative method for preventing a bus driver contention. This alternative method differs from the method described above, in that the alternative method does not require the inverter 150 from the buffer clock enable signal 126 or the pull-up resistor 152 on the buffer direction control signal 135. This alternative method includes additional steps inserted between steps 503 and 603 and 504 and 604 as discussed below.

In step 503*a*, which occurs after step 503, the outputs of all nets are driven "LOW" except the read ENABLE direction control to the latched transceiver 112. This causes a "LOW" value to be driven on the buffer data signal 138 and DATA 1 in FIG. 4 (*b*) will therefore cause a "LOW" value to be latched into all transceivers. In step 503*b*, outputs of the memory control logic circuit are tri-stated, which is identical to steps 503 or 505 and this step, like step 503 as described above, is not necessary.

Figure 5:
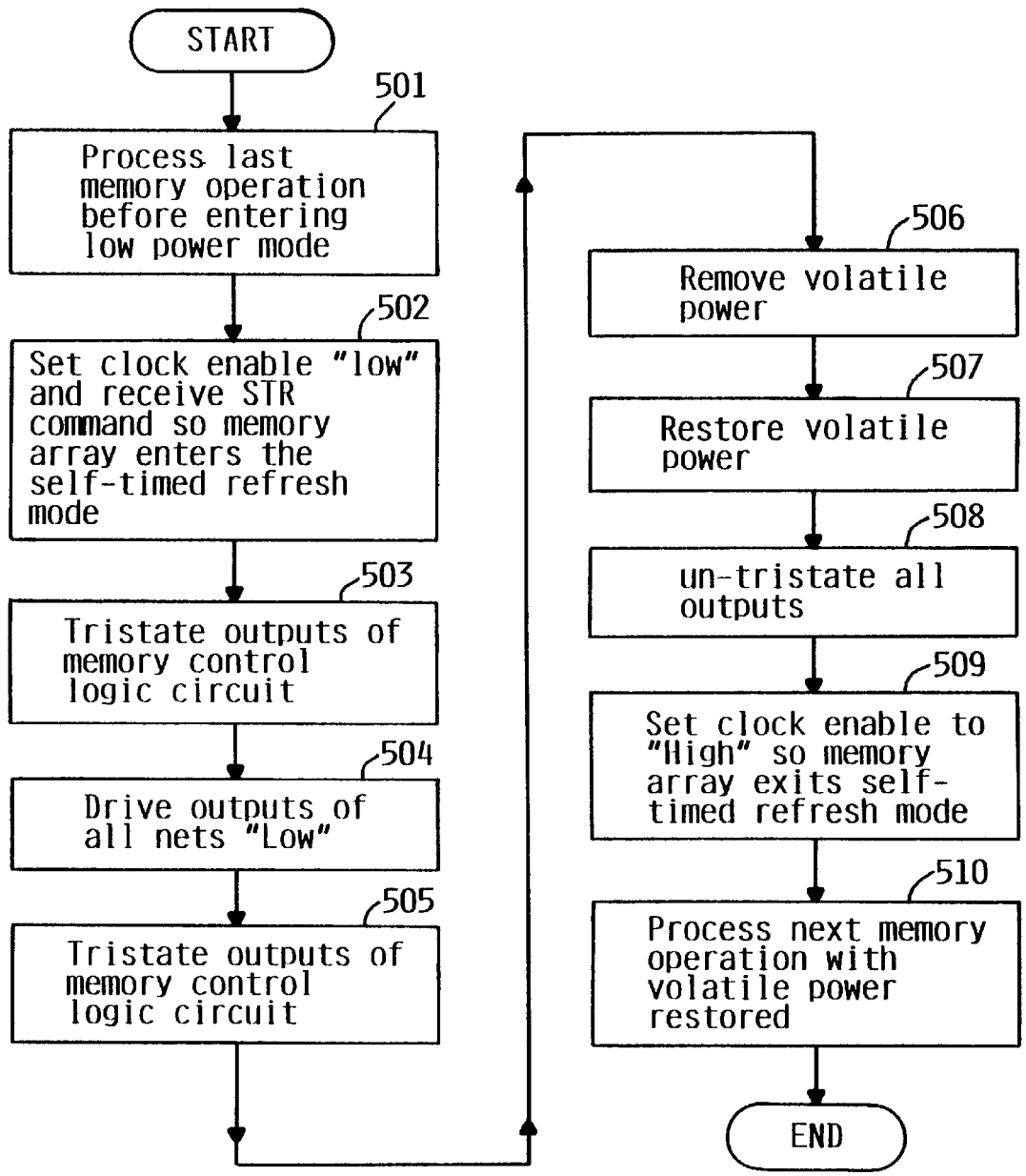
FIG. 5 is a flowchart illustrating the process of entering the low power mode by the continuously powered mainstore illustrated in FIG. 2.
Figure 6A:
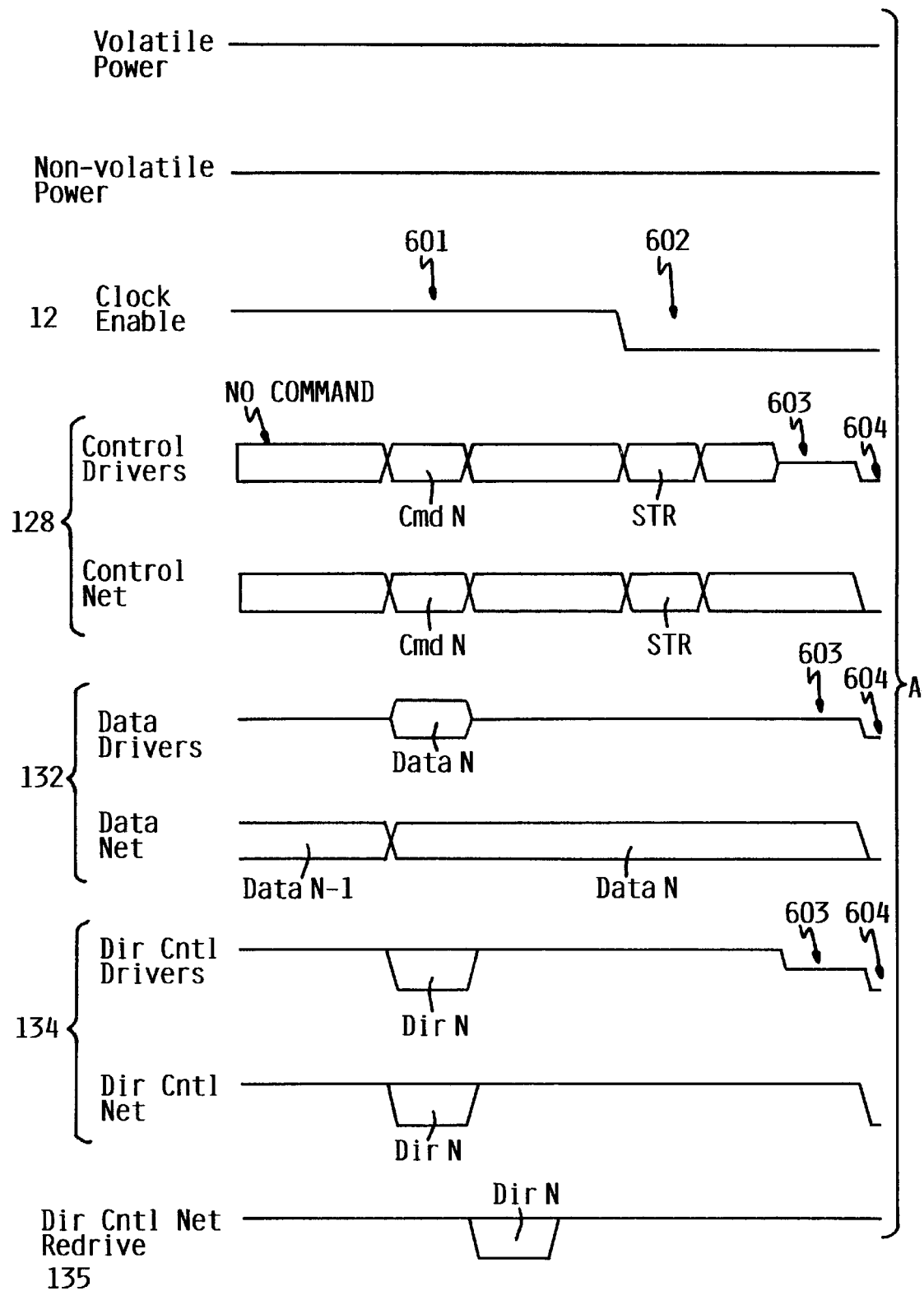
FIG. 6 is a timing diagram further explaining the operation of the device illustrated in FIG. 2.
Figure 6B:
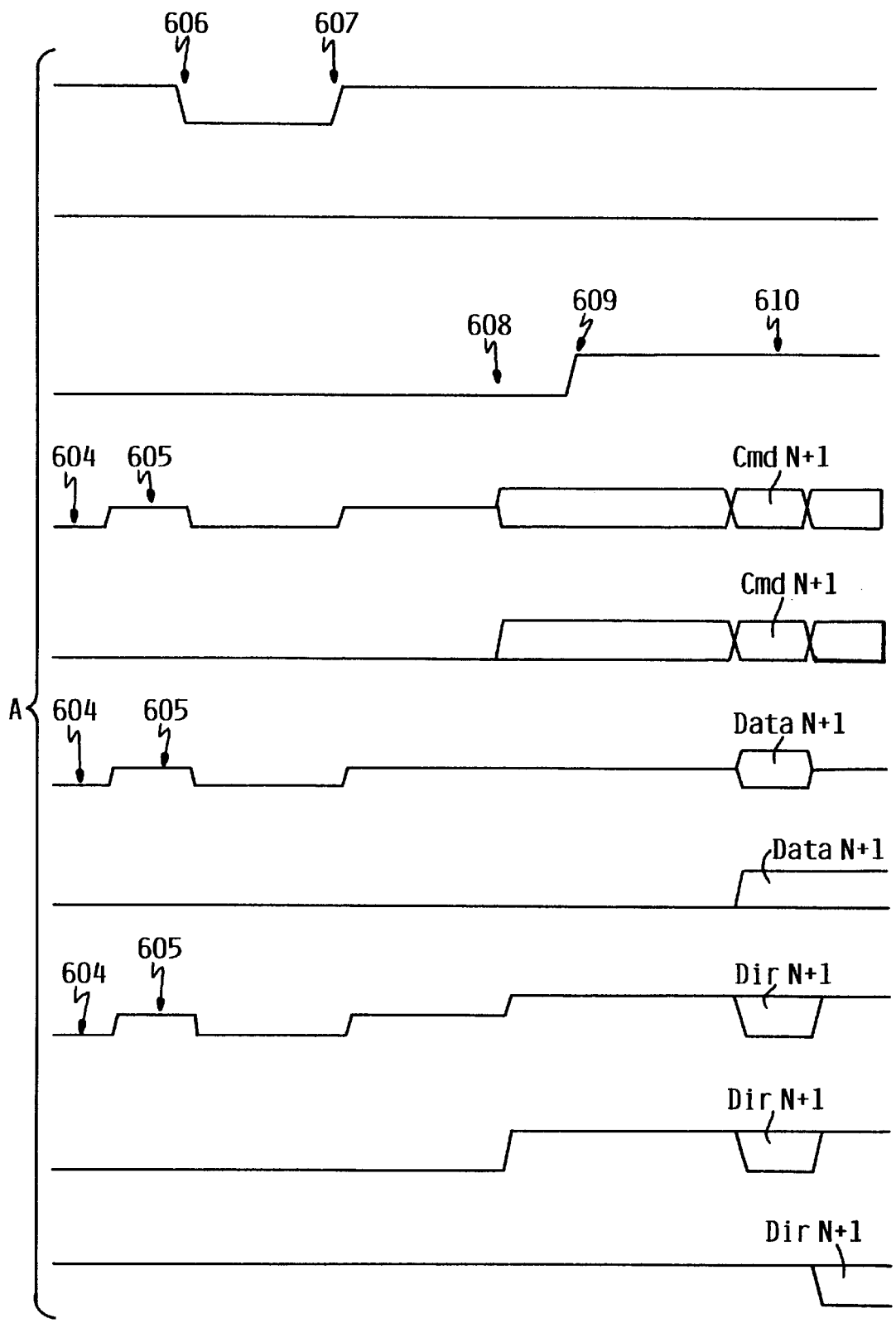

After step 504 illustrated in FIG. 5 is performed, since there is no inverter clock enable signal keeping the direction controls disabled, the transceivers will all be actively driving, however, since all transceivers have latched a "LOW" value, all transceivers will be driving the same logic level and not suffer the driver contention problem. One advantage of this alternative method is that an additional inverter and pull-up resistor are not required on the memory card.

Whether steps 503 and 503*b*, discussed above, are "optional" or not, depends on the method utilized for driving the outputs of all nets "LOW" in steps 504 and 503*a*. The first method includes scanning the latches that feed the drivers in the memory control chip. In order to prevent inadvertent switching of the drivers as the scanning procedure takes place, it is desirable to have the driver tri-stated until the scanning is complete, then enable the drivers to drive the desired values. This is one reason for tri-stating the drivers in steps 504 and 503*a*. When using this scanning technique, the actual procedure is to (a) tri-state drivers, and (b) scan desired values into the driver latches.

The second method to drive the appropriate values is to implement a hardware sequencer directly within the chip to control the drivers appropriately and more directly. Since this method would not have the side effect of inadvertently switching the drivers as the scan is taking place, the tri-state steps are truly optional.

Another problem may exist with the ENABLE input pin of the control signal latch redrive circuit 108. Because there is no bus/hold circuit on the ENABLE input pin of the control signal latched drive circuit 108, the net 132 may float "HIGH" when the memory control circuit tri-states at step 505. If the memory includes a large number of memory cards in parallel a large number of the ENABLES for the control latched redrive circuits 108 must be driven "LOW" at the same time. As a result, a surge of current must be provided by the non-volatile power domain. One solution to this problem is to tie the ENABLE of the control signal latched redrive circuit 108 to an unused INPUT with a bus/hold circuit on it and use that bus/hold circuit to hold the ENABLE line "LOW". Such a current surge may trigger any current limiting protection circuit included with the non-volatile power supply.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A computer system, comprising:

a memory circuit for storing data;

a memory control circuit for controlling a flow of data to and from said memory circuit; and a redrive circuit for boosting control and data signals received from said memory control circuit and supplying boosted control and data signals to said memory circuit;

wherein when said computer system is in a low power mode, said redrive circuit and said memory circuit are maintained in a non-volatile power domain and said memory control logic is maintained in a volatile power domain.

2. The computer system of claim 1, said computer system further comprising:

a pullup circuit for pulling up a value supplied to said redrive circuit to a valid logic level to drive said redrive circuit; and a buffer device for preventing current leakage from the non-volatile power domain into the volatile power domain in the low power mode.

3. The computer system of claim 2, wherein said buffer device is a non-inverting buffer and said pullup circuit is a resistor.

4. The computer system of claim 2, wherein said pullup circuit is provided separate from said redrive circuit.

5. The computer system of claim 2, wherein said buffer device prevents current leakage from said redrive circuit in the non-volatile power domain to said memory control circuit in the volatile power domain.

6. The computer system of claim 2, wherein said buffer device prevents current leakage from said redrive circuit in the non-volatile power domain to a positive voltage source in the volatile power domain.

7. The computer system of claim 4, wherein said buffer device prevents current leakage from said redrive circuit in the non-volatile power domain to said memory control circuit in the volatile power domain.

8. The computer system of claim 4, wherein said buffer device prevents current leakage from said redrive circuit in the non-volatile power domain to a positive voltage source in the volatile power domain.

9. A method of controlling a computer system, including a memory circuit, a memory control circuit, and a redrive circuit to enter and exit a low power mode, comprising the steps of:

(a) placing the memory circuit in a self-timed refresh mode, upon receipt of a low clock enable signal and a self-timed refresh command;

(b) driving all outputs of the memory control circuit to the redrive circuit low;

(c) tri-stating all outputs of the memory control circuit to the redrive circuit;

(d) removing volatile power to enter the low power mode;

(e) restore volatile power to exit the low power mode; and (f) removing the memory circuit from the self-timed refresh mode, upon receipt of a high clock enable signal.

10. The method of claim 9, wherein the low power mode, the redrive circuit and the memory circuit are maintained in a non-volatile power domain and the memory control logic is maintained in a volatile power domain.

11. The method of claim 9, wherein before said step (b), all outputs of the memory control circuit to the redrive circuit are also tri-stated.

12. The method of claim 9, wherein the redrive circuit includes a clock enable redrive circuit and a bidirectional transceiver circuit and the low clock enable signal from the clock enable redrive circuit is set high and then provided to the bidirectional transceiver circuit.

13. The method of claim 9, wherein said step (a) further includes driving all outputs to a bidirectional transceiver circuit low except for a read enable signal.

14. The method of claim 13, wherein the read enable high prevents the bidirectional transceiver circuit from driving back to the memory control circuit.

* * * * *